A. E. ALDRIDGE.
HAT PIN GUARD.
APPLICATION FILED AUG. 2, 1911.

1,019,938.

Patented Mar. 12, 1912.

WITNESSES:
Robert M. Grunwell
John S. Schrott

INVENTOR
Albert E. Aldridge
BY
Fred G. Dieterich & Co
ATTORNEYS

UNITED STATES PATENT OFFICE.

ALBERT E. ALDRIDGE, OF VICTORIA, BRITISH COLUMBIA, CANADA.

HAT-PIN GUARD.

1,019,938.  Specification of Letters Patent.  Patented Mar. 12, 1912.

Application filed August 2, 1911. Serial No. 641,997.

*To all whom it may concern:*

Be it known that I, ALBERT E. ALDRIDGE, citizen of the Dominion of Canada, residing at Victoria, in the Province of British Columbia, Canada, have invented a new and useful Hat-Pin Guard, of which the following is a specification.

This invention relates to a point protector or guard for a hat pin and is designed so as to be readily applicable to the point of a pin without any further movement other than placing it thereon and that is provided with a holding means that will resist any ordinary pull to remove it unless the clutch is released by a pressure inward of a small plunger in the end. The device thus acts not only as a protector to prevent injury being caused by the projecting point of the pin but also securely holds the pin in place against accidental or unauthorized withdrawal.

Figure 1:
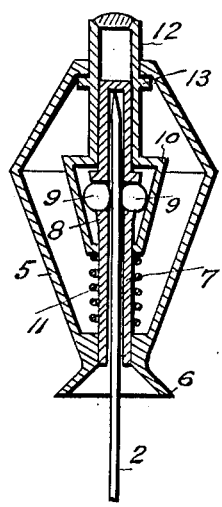
Figure 2:
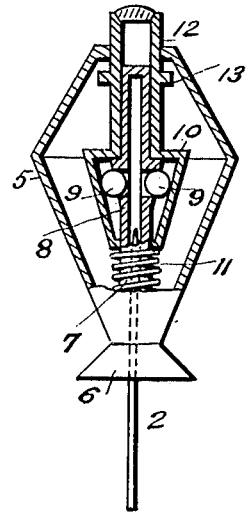
Figure 3:
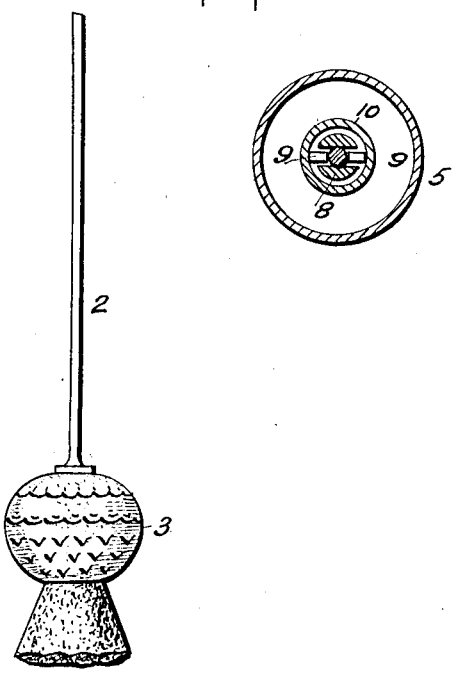

The invention is particularly described in the following specification, reference being made to the drawings by which it is accompanied, in which:

Figure 1 represents a longitudinal section to an enlarged scale showing the protector in position on an ordinary hat pin. Fig. 2 represents the same as in the position of release, pressure being applied to the releasing plunger as indicated by the arrow. Fig. 3 is a cross section through the clutch, and Fig. 4, a similar view showing a modification in the use of grooved clutch rollers.

In these drawings 2 represents an ordinary hat pin, 3 being the head of the same.

The guard comprises an external casing 5 of any suitable material and susceptible of any desired ornamentation. This casing is provided with a flared inlet 6 directing the pin into the axial bore of a tubular stem 7 which is secured in the flared end of the casing 5 and extends approximately to the other end. This tubular stem 7 is provided with an enlargement 8 having a rectangular aperture diametrically through it and adapted to receive two small rollers 9 one on each side of the axial pin aperture. These rollers 9 are retained in position and pressed together on one another, or on the point of the pin 2 when inserted between them, by a conical sleeve 10 slidably mounted on the tubular stem over the enlargement 8 the smaller end of which sleeve is urged toward the rollers by a coiled spring 11 between the end of the casing 5 and the smaller end of the conical sleeve 10. With this construction, the point of the pin 2 may readily be inserted in the aperture of the stem 7 and will pass between the rollers 9 the sleeve 10 moving endwise against the resistance of the spring 11 as the rollers are pressed back by the entering pin. If attempt is made to withdraw the pin the rollers 9, moving upward toward the smaller dimension of the conical sleeve 10, will effectively clutch the pin and resist withdrawal as the tighter it is pulled the tighter the rollers 9 will clutch as they are rolled toward the smaller dimension of the conical sleeve. Release can only be effected by moving the sleeve 10 endwise against the resistance of the spring 11 so as to bring a larger dimension of the sleeve opposite to the rollers and relieve them of any pressure on the pin. This endwise releasing pressure is applied by means of a small plunger 12 fitting upon the end of the stem 7 and provided with a shoulder or collar 13 which retains it within the casing 5. The end of this plunger is susceptible of decorative treatment in accord with that of the casing 5.

Although the form of the casing is not material to the subject matter of the invention, it is desirable that the design should be such as will afford a convenient hold for the finger and thumb while the fore finger is applied to the plunger 12 to effect release. The construction is exceedingly simple and its action in use is particularly efficient as the small rollers being directly opposed to one another obtain a most secure hold of the pin.

Figure 4:
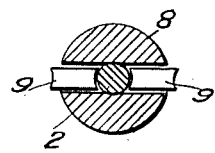

In the drawing, the rollers are somewhat out of proportion in order to properly present them. In actual size they are very minute and are simple sections cut from a steel wire. If desired, they may be grooved, as shown in Fig. 4, in which case they will each have a line of contact on the pin instead of a point as is the case with a cylindrical roller.

The guard can be applied to a hat pin with ease as the flared inlet enables it to be readily placed on the point of the pin and when so placed it automatically obtains an effective hold.

Having now particularly described my invention and the manner of its use, I hereby declare that what I claim as new and desire to be protected in by Letters Patent, is:

As a hat pin guard, the combination with a tubular member having a bore adapted to fit upon the pin, said tubular member having an enlargement through which a small slot is diametrically cut, opposed rollers in the slot one on each side of the pin bore, a conical sleeve slidably mounted on the tubular member inclosing the enlargement and its rollers, a casing secured to the tubular member at the end toward the smaller dimension of the conical sleeve, a coil spring between the smaller dimensions of the sleeve and the adjacent end of the casing, and a plunger fitting on the tubular member and projecting through the end of the casing said plunger having a stop for engaging said casing to limit the movement of the plunger under the influence of the spring said tubular member enlargement forming a shoulder against which said plunger engages when moved to compress said spring, said shoulder thereby forming a stop for said plunger when moved to its spring compressed position and means connecting said sleeve and said plunger whereby the plunger is put under the influence of said spring.

In testimony whereof I have signed my name to this specification in the presence of two subscribing witnesses.

ALBERT E. ALDRIDGE.

Witnesses:
CHARLES F. SMITH,
ERNEST G. MAYNARD.

Copies of this patent may be obtained for five cents each, by addressing the "Commissioner of Patents, Washington, D. C."